United States Patent
Ratn et al.

(10) Patent No.: US 9,037,820 B2
(45) Date of Patent: May 19, 2015

(54) OPTIMIZED CONTEXT DROP FOR A SOLID STATE DRIVE (SSD)

(75) Inventors: Prasun Ratn, Bangalore (IN); Suhas Nayak, Portland, OR (US); Sanjeev N. Trika, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 277 days.

(21) Appl. No.: 13/537,377

(22) Filed: Jun. 29, 2012

(65) Prior Publication Data

US 2014/0006683 A1    Jan. 2, 2014

(51) Int. Cl.
| | |
|---|---|
| *G06F 12/00* | (2006.01) |
| *G06F 11/14* | (2006.01) |
| *G06F 13/00* | (2006.01) |
| *G06F 13/28* | (2006.01) |
| *G06F 12/10* | (2006.01) |

(52) U.S. Cl.
CPC ........ *G06F 11/1446* (2013.01); *G06F 12/1009* (2013.01)

(58) Field of Classification Search
CPC .......... G06F 11/1446; G06F 12/1009
USPC ............. 711/203, 206, 162; 714/2; 707/682
See application file for complete search history.

(56) References Cited

U.S. PATENT DOCUMENTS

| | | | |
|---|---|---|---|
| 6,189,074 B1 * | 2/2001 | Pedneau .................. | 711/139 |
| 2005/0240531 A1 * | 10/2005 | Wolff, Jr. .................. | 705/53 |
| 2006/0136685 A1 * | 6/2006 | Griv et al. .................. | 711/162 |
| 2007/0055816 A1 | 3/2007 | Wang et al. | |
| 2008/0089161 A1 | 4/2008 | Wong et al. | |
| 2009/0013122 A1 * | 1/2009 | Sepe et al. .................. | 711/103 |
| 2010/0235565 A1 | 9/2010 | Ton-That et al. | |
| 2010/0332730 A1 | 12/2010 | Royer, Jr. et al. | |
| 2011/0082963 A1 * | 4/2011 | Jeddeloh .................. | 711/103 |
| 2011/0258487 A1 | 10/2011 | Royer et al. | |
| 2011/0296123 A1 | 12/2011 | Adler et al. | |

FOREIGN PATENT DOCUMENTS

WO    2014004731 A1    1/2014

OTHER PUBLICATIONS

International Search Report and Written Opinion received for PCT Patent Application No. PCT/US2013/047992, mailed on Oct. 21, 2013, 10 pages.

* cited by examiner

*Primary Examiner* — Yong Choe
*Assistant Examiner* — Mark Giardino, Jr.
(74) *Attorney, Agent, or Firm* — Chapin IP Law, LLC

(57) ABSTRACT

A mass storage system employs a paging table for memory page redirection and maintains the paging table for power loss recovery (PLR) using a FIFO queue of paging table (L2P) segments to be written to non-volatile memory. The FIFO queue identifies a sequence of the L2P segments in conjunction with sequence number and marking data of the affected segments for recreating the paging table. Upon power failure, a power loss recovery (PLR) mechanism scans for the last segment written based on the FIFO queue. The PLR process recovers unwritten paging table entries by replaying the corresponding changes in the order defined by the sequence numbers. The recovery process continues for each sequence number in the current context, until the L2P information in the paging table is recreated to the point just prior to power loss.

18 Claims, 9 Drawing Sheets

OPTIMIZED CONTEXT DROP FOR A SOLID STATE DRIVE (SSD)

BACKGROUND

Solid state drives (SSDs) are increasing in popularity over traditional hard disk drives (HDDs) for several reasons. SSDs provide up to 66-percent faster responsiveness compared to hard drives, allowing faster boot-up, application launch, and re-loading. SSDs have no moving parts for higher reliability and longer life span. SSDs are sufficiently rugged enough to withstand bumps and shocks without data loss due to a "head crash" common with the close physical tolerance between a read/write head and conventional rotating media surface, and SSDs have lower power consumption which extends battery life. In host computing devices employing a mass storage device, such as laptops, tablets, and other mobile and desktop devices, SSDs are therefore becoming popular as suitable replacements for the HDD as the primary mass storage device. Further, the advantages of SSDs are not only limited to client computing devices such as portable/personal electronic devices, but are also very popular in the enterprise segment for more demanding applications due to their better performance and reliability over rotating media surfaces such as those in conventional HDDs.

While SSDs employ non-volatile memory such as NAND flash memory, certain functions may be reserved for onboard volatile memory such as Dynamic Random Access Memory (DRAM). In operation, during a "clean" (i.e. expected or user initiated) shutdown, most host systems initiate a shutdown or idle command to an SSD to give the SSD enough time to prepare for the shutdown. This allows the SSD to save data or internal state currently in temporary buffers of the volatile memory to the non-volatile media. However, during an unexpected or sudden power shutdown, the SSD abruptly loses power before the host system can initiate the appropriate command. This may prevent data in the temporary buffers in the volatile memory from being saved in the non-volatile memory.

BRIEF DESCRIPTION OF THE DRAWINGS

The foregoing and other features will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
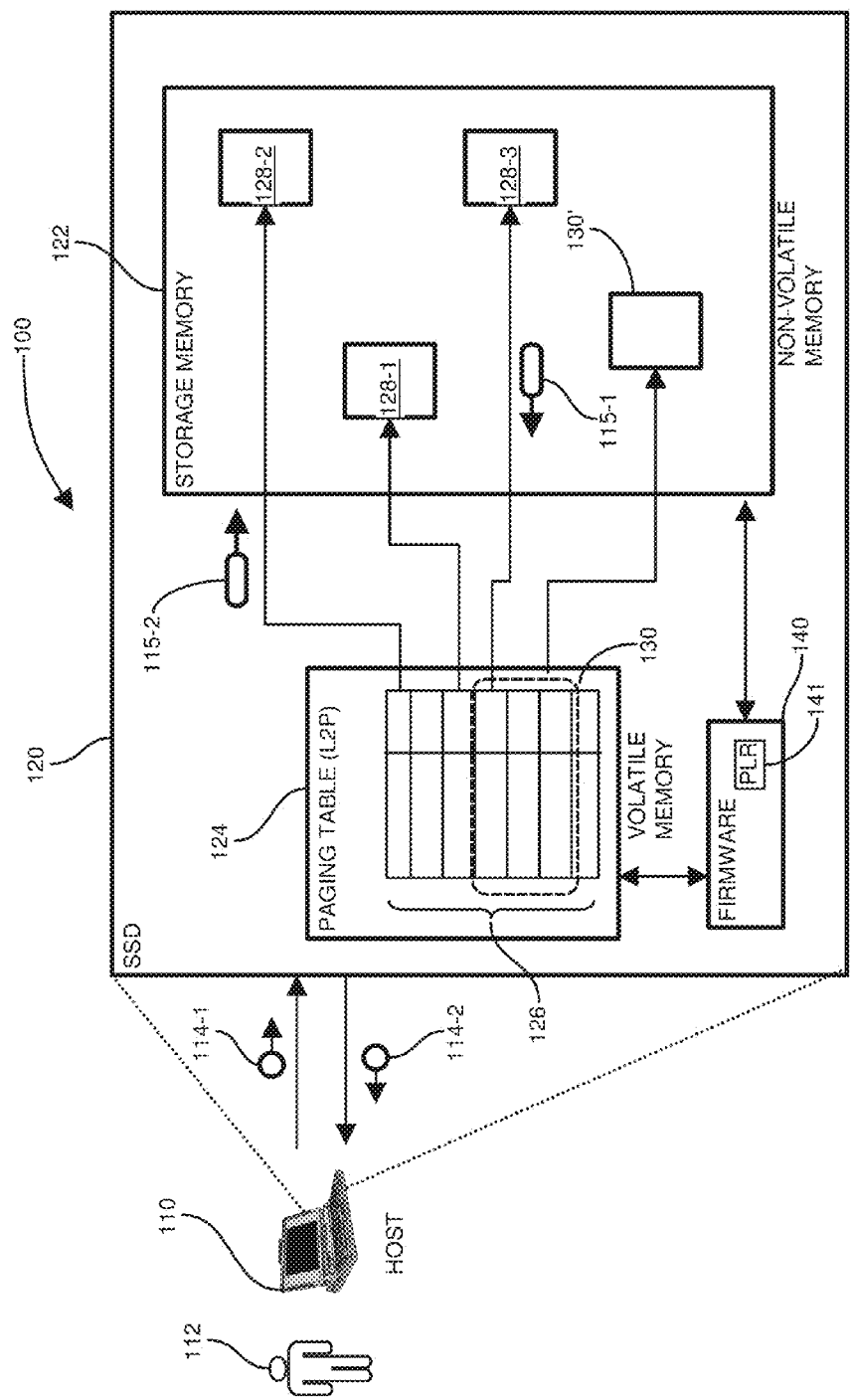
FIG. 1 is a context diagram of a computing environment suitable for use with configurations herein.

SSDs enjoy several advantages over conventional, mechanical HDDs. SSDs have no moving parts, are faster, and have lower power consumption than their high-speed rotating counterparts. In SSDs, a logical-to-physical (L2P) table (paging table) is often employed to translate logical addresses to physical locations on the SSD. Computing systems typically employ various types of virtual and/or dynamic addressing to avoid binding software to physical mass storage locations. The L2P table maps I/O requests from a host computer system to physical address locations via the L2P. The L2P provides redirection of segments, or pages, of memory to optimize memory usage on the mass storage device (SSD).

In particular arrangements, such as those disclosed herein, the SSD employs faster volatile memory such as DRAM for the L2P table, for facilitating memory access from the host device. Any suitable volatile memory may be used, for example Synchronous Dynamic Random Access Memory, Dynamic Random Access Memory, RAMBUS DRAM and Double Data Rate three SDRAM. However, events such as loss of power may compromise the L2P, possibly resulting in loss of data of the L2P table. The L2P table may be paged so as to avoid a full volatile memory representation of the entire L2P table. In this approach, in the event of a power failure, a power-fail recovery manager ensures the data integrity of the L2P address mapping table associated with the non-volatile memory is maintained via a power-fail recovery manager that recovers the L2P address mapping table associated with the non-volatile memory after a power fail or crash event.

In the proposed approach, non-volatile flash memory based SSDs and caches offer a performance and power benefit over traditional hard disk drives. It has been found earlier that a flat indirection system to translate logical-to-physical addresses (L2P Table) is useful in providing consistent, reliable and predictable performance. The L2P is kept in volatile memory, and periodically saved as part of a "context," or stable set of system variable, on non-volatile memory, including at shutdown time. In case of a power-fail, the changes to L2P after the last context save are lost, and must be rebuilt during subsequent boot. Depending on configuration, for example, any suitable non-volatile memory may be employed, including but not limited to NAND flash memory, phase change memory (PCM), electrically erasable programmable read only memory (EEPROM), or any other type of non-volatile memory device such as PCMS, Nanowire and FeTRAM based implementations.

Configurations herein are based, in part, on the observation that a power failure recovery for reconstructing the L2P may involve traversing a large number of paged changes previously written to disk. In an SSD, the L2P may take the form of a paging table that requires an entry for each page of memory. While the actual paging table size depends on the page size, a typical factor is about $\frac{1}{1000}^{th}$ of the memory area represented. Therefore, a 1 TB drive requires 1 GB of volatile memory merely for maintaining the paging table. Unfortunately, conventional approaches suffer from the shortcoming that, in addition to increasing the cost of the SSD due to volatile memory, the larger size may require substantial recovery time in the event of power loss to recreate the paging table.

In performance critical applications, the total power-fail recovery time might easily exceed boot-time requirements due to the paging overhead. Depending on the drive capacity, volatile memory size and workload characteristics it can take 30+ seconds to boot the drive, which tends to defeat customer expectations and product practicality.

In some configurations, paging the L2P table mitigates recovery time somewhat, however the majority of paged-out segments still need to be traversed in a replay process used to recreate the L2P table. Accordingly, configurations herein substantially overcome the shortcoming of extended power loss recovery time by reducing paging references (so called "page-outs") during the replay process by defining a FIFO (First-In, First Out) queue of paging table segments (in contrast to conventional LRU, or least recently used queues), and replaying only the segments not flushed (written to storage memory) just prior to the power failure. In further detail, the example arrangement employs replay for segments not flushed (but were in volatile memory prior to power loss) and also segments that were flushed since the last flushed segment was put into the FIFO queue during run-time. Based on the number of queued segments, the approach may potentially flush (B−1) segments and hence also replay them where B is the max number of segments that can be stored in the volatile memory. For example, if segment 100 is the last flushed segment before power loss, the disclosed approach will not only replay from the point this segment was flushed but from the point this segment was put into the FIFO queue at run time and during this replay one could easily have a scenario wherein all the segments in the FIFO prior to segment 100, say 1 to 99, are replayed. In other words, the replay operation traverses changes back to the last entry in the FIFO queue to recreate the L2P table.

Successful Power-Loss Recovery (PLR) for SSDs rebuilds the L2P table, and this requires run-time and recovery-time components. During runtime, the context is saved periodically along with pointers into the non-volatile memory write streams. The writes during run-time are associated with sequence numbers that allow orderly replay in case PLR is necessary. On power-up, the last saved context is loaded into memory. The PLR algorithm then starts replaying from the saved write stream pointers onwards, updating the L2P table, until the last write completed to non-volatile memory prior to power-failure. A method to use flat indirection with reduced memory for cost reduction is discussed in the copending patent application cited above.

The approach depicted below, therefore, defines a FIFO queue of paging table (L2P) segments to be written to non-volatile memory. Each segment in the paging table corresponds to a page of memory on which the paging table itself is stored, and contains a plurality of entries each mapping another page of memory references via the paging (L2P) table. The segments are written in sets called bands, discussed in greater detail below. The upper bound of replay is therefore defined by the size of the volatile memory supporting the paging table; the remainder remains paged out. Onboard firmware writes the segments based on FIFO queue along with a sequence number and marking data of the affected segments for recreating the paging table mapping information from the replay process.

Upon power failure or other compromise, a power loss recovery (PLR) mechanism scans for the last segment written based on the FIFO queue ordering, as determined by the sequence numbers. The PLR process recovers unwritten paging table entries by replaying the corresponding changes in the order defined by the sequence numbers. Replaying employs a replay process or sequence to recreate the L2P table, and is used by the PLR to reconcile differences between pages (segments) actually written to non-volatile memory and corresponding references to those non-volatile pages still stored in volatile memory in the paging table. Pages recently written but not yet reflected in the paging table (L2P) have markers identifying the changed pages, and a sequence number identifying the order written (same ordering as from the FIFO queue). The system bands, discussed further below, denote the paging table writes to non-volatile storage. The replay process identifies the changed pages by scanning for the markers, and identifies the ordering from the sequence number. Thus, the replay operation traverses changes back to the last entry in the FIFO queue to recreate the L2P table. Corresponding changes are identified by the marking information in the previously written segments precipitating the paging table changes. The recovery process continues for each sequence number in the current context, until the L2P information in the paging table is recreated to the point just prior to power loss.

In implementation, the approach proposed herein adds a FIFO queue to keep track of the order in which segments become dirty (first-touch). Dirty segments enter at the tail of the queue and are evicted from the head of the queue. Dirty segments are evicted using FIFO policy (rather than the LRU policy in existing approaches). The ordering of evictions is motivated by the need to minimize paging during replay. In addition, when a segment first becomes dirty, the write stream locations are recorded and later saved as segment metadata when the segment is paged-out, in order to assist the PLR algorithm.

The PLR algorithm is modified to first scan for the last paged-out segment (identified by its sequence number). This segment specifies locations of the write-stream pointers at the time when the segment first became dirty. In the disclosed approach, the replay is started from this location rather than from the location of the last context save, in order to reduce PLR-time further. The context denotes a set of system variables, including the L2P information in the paging table, representative of a stable, consistent state. The disclosed PLR therefore minimizes and bounds the required number of segment page-ins and page-outs during power-fail recovery, thus reducing the PLR time to meet target requirements, and making L2P paging practical.

In other configurations, the replay is performed by replaying the system bands of segment paging activity, discussed further below. Also, an alternate arrangement, in host devices with smaller volatile memory capacity, eliminates page-outs during replay. During runtime, each page-out is accompanied by storing a list of dirty (modified) segments into the context band. The context band represent a set of the modified segments flushed (written to non-volatile memory) together, rather than performing a separate flush (write) for each segment. During replay, only the L2P updates that correspond to a segment from this list are allowed, also discussed further below.

FIG. 1 is a context diagram of a computing environment suitable for use with configurations herein. Referring to FIG. 1, in a computing environment 100, a host device 110 is responsive to a user 112. The host device 112 issues Input/Output (I/O) requests 114 to read 114-1 and write 114-2 data to the mass storage device, or SSD 120 in the configuration shown. In a typical configuration, the SSD replaces the conventional mechanical (rotating) disk drive of the host, using a storage bus interface such as SATA (Serial Advanced Technology Attachment), however may be any suitable bus/architecture arrangement, such as Mini-SATA, SAS (Serial Attached SCSI), FC (Flip-Chip), a PCI (Peripheral Component Interconnect) based arrangement, or others. In response, the storage memory returns fetched pages 115-1 or acknowledges written pages 115-2, typically in response to user applications or SSD firmware 140 for performing the operations herein In a typical configuration, the SSD 120 actually occupies an equipment bay in the host device 110, and is shown in an exploded manner for illustrative purposes. In the SSD 120, a storage memory 122 comprises an non-volatile flash memory, although any suitable non-volatile memory may be employed, such as phase change memory (PCM), electrically erasable programmable read only memory (EEPROM), to name several. A paging table 124 is stored in the volatile memory may include DRAM (Dynamic Random Access Memory) or other high-speed volatile memory, such as Synchronous Dynamic Random Access Memory (SDRAM) or RAMBUS Dynamic Random Access Memory (RDRAM). The paging table 124 (L2P table) includes entries 126, each of which redirects memory access to pages 128 in non-volatile memory. However, due to the size of the paging table 124, segments of the paging table 130 may themselves be swapped out 130' to the non-volatile (storage) memory 122. To emphasize this distinction, operations referring to the paging table 124 will be denoted as segments 130, each containing entries 126 that point to other pages 128 in the storage memory. System software or onboard firmware 140 contains instructions for storing and retrieving the paging table segments 130' from the storage memory, and for managing FIFO queuing of segment 130 writes, discussed below in FIG. 2. In a host 110 managed SSD, the instructions emanate from the host, rather than onboard firmware 140. An interface to the storage memory 122 and to the paging memory for storing the paging table 124 is responsive to the software/firmware 140 and PLR logic 141.

In the SSD 120, the firmware 140 includes logic for managing the runtime queuing and paging of the paging table 124, and includes PLR 141 logic for managing the startup/recovery mechanism, discussed further below. The paging table 124 (also referred to as the L2P mapping information) undergoes a replay process, performed by the PLR, in which previously committed writes to the storage memory 122 and reflected in the paging table 124, but not yet written to storage memory 122 as pages 130', are recreated. System bands, discussed further below, combined with markers in the pages and sequence numbers 131 on the paging table segments 130', are employed by the PLR to restore the paging table 124 to a pre-power loss state, also discussed further below. Conventional approaches require replaying all system bands from a previous context drop flushing the paging table to storage memory 122. Configurations herein reduce the replay time by employing a FIFO queue to write the paging table segments 130' such that the replay is limited by the page table segments 144 in the queue 142 at the time of power failure.

Figure 2:
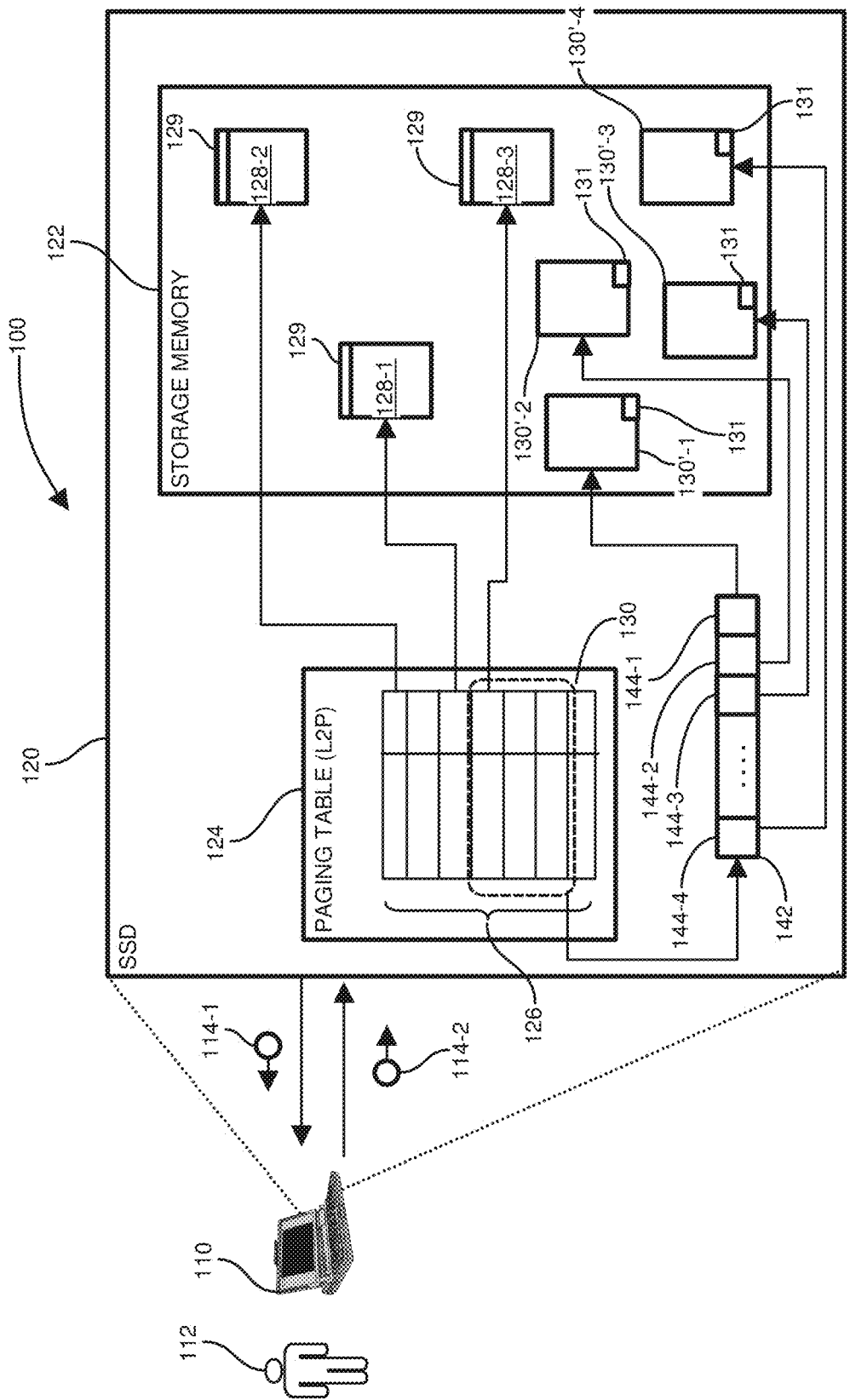
FIG. 2 is a block diagram of paging table storage as in FIG. 1.

FIG. 2 is a block diagram of paging table storage as in FIG. 2. Referring to FIGS. 1 and 2, the SSD maintains a queue 142 for storing paging table segments 130 to be flushed (written) to storage memory 122. The firmware 140 writes queue entries in FIFO order, which allows the PLR mechanism to retrieve the segments 130 in the same order in which they were written. Each entry 144-1 . . . 144-4 corresponds to a flushed segment 130' in storage memory. A sequence number 131 accompanies each flushed segment 130'-1 . . . 130'-4, facilitating scanning for the ordered segments 130 upon power up (PLR) initiation. Markers 129 in the previously written pages contain information for recreating the paging table 124. In particular configurations, the segments are flushed as groups of system bands, discussed further below.

Figure 3:
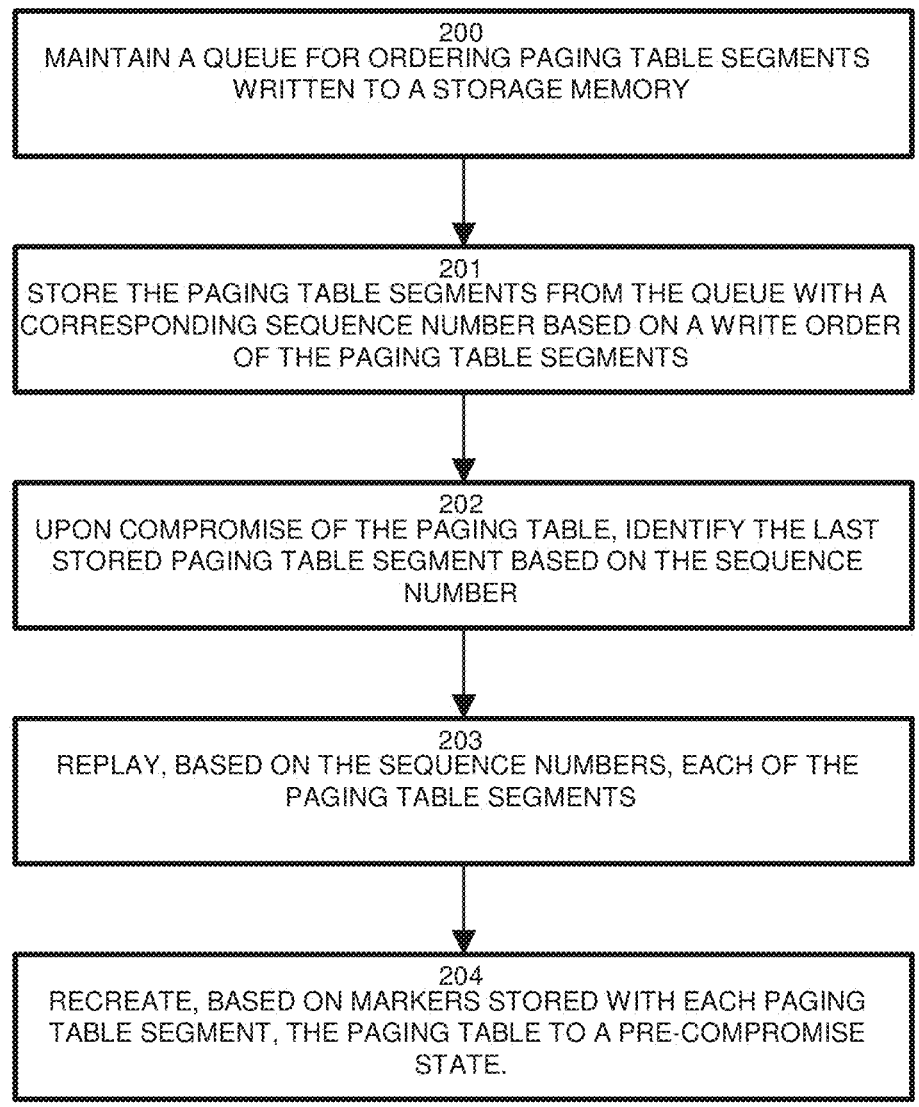
FIG. 3 is a flowchart of paging table (L2P) storage and recovery in the environment of FIG. 1.

FIG. 3 is a flowchart of paging table (L2P) storage and recovery in the environment of FIG. 1, and depict an example configuration performing the operations disclosed herein. Referring to FIGS. 1-3, at step 200, in the SDD 120 having a paging table 124 for memory page redirection, the method of maintaining the paging table 124 for power loss recovery (PLR) includes maintaining a queue 142 for ordering paging table segments 130' written to the storage memory 122. The storage memory 122 stores the paging table segments 144 from the queue 142 with a corresponding sequence number 131 based on a write order of the paging table segments 131', as depicted at step 201. The sequence number is employed in traversing the segments 130' in the order written to recreate the paging table 124 during a power loss recovery PLR. Upon compromise of the paging table, such as in a power failure, the firmware 140 identifies the last stored paging table segment 130'-1 (written from 144-1) based on the sequence number 131, as shown at step 202, and replays, based on the sequence numbers 131, each of the paging table segments 130, as depicted at step 203. Since the actual memory pages 128, for which the paging table provides indirection, have already been written to the storage memory, the markers 129 in the memory pages 128 provide the redirection (pointer) information that, based on the sequence numbers 131, allow recreation of the paging table 124. The firmware 140 recreates, based on markers 129 stored with each paging table segment 128, the paging table 124 to a pre-compromise state, as depicted at step 204. Since the paging table 124 denotes page mapping, or indices, reflecting the physical locations of actual changed data pages 128, recreating is performed by tracking the previously stored pages 128 and reapplying (replaying) the changes to the paging table 124.

As a matter of performance, this approach bounds the page-outs during replay, because of the following observations. If consideration is given to the sequence of writes during run-time between a) the last paging table 124 (L2P) segment 130' being paged out, and b) power-failure. The paging table 124 updates for all writes during this period were fulfilled in volatile memory without requiring a page-out (otherwise, (a) is not true). The queue 142, and hence the paging table, stores a maximum of |B| segments 144.

During replay, the system bands (discussed below) are replayed to reconstruct the paging table 124. Each band, and corresponding segments within the band, has a sequence number so the order that the bands were written is known. The last write in the latest open (system) band is the last L2P segment paged out (call this segment k, referenced below in FIG. 4). The write stream locations are selected from this segment and replay is carried out from these locations onwards. During runtime, there may be a maximum of |B|−1 number of page-outs between the segment k becoming dirty and segment k being paged-out. There are no page-outs between segment k being paged-out and power-failure (this follows from the definition of segment k). Therefore, during replay, there may be a maximum of |B|−1 page-outs.

Figure 4:
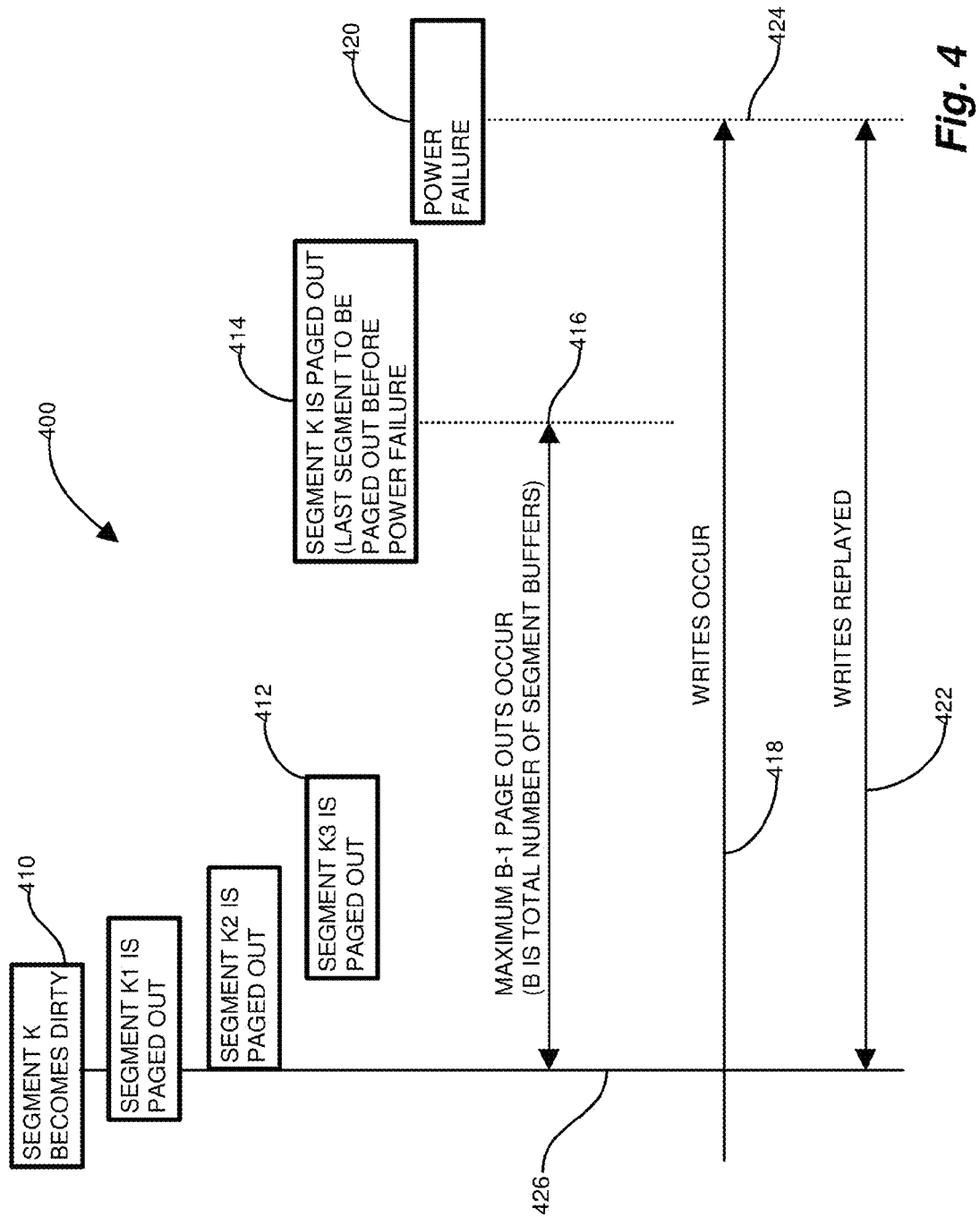
FIG. 4 shows a timing diagram of the approach of FIG. 3.

FIG. 4 shows a timing diagram of the approach of FIG. 3. Referring to FIGS. 2-4, FIG. 4 shows timing of segment queue 142 writes and flushes. As described above, the write enqueues the segment in the queue 142 to volatile memory 124; the flush performs the write to non-volatile memory 122. Note that the L2P segment 144 state changes (becomes dirty, is evicted etc.) can be presented on a timeline 400 of writes. The number of segments that can be dirty after the last segment is paged out is |B|−1 where |B| is the total number of segment buffers 130 available. It follows that, the number of segments that were paged out between segment k becoming dirty and segment k being paged out is equal to or less than |B|−1. Therefore, when the replay process replays writes starting from the location stored in metadata of segment k, the number of page outs is bounded by |B|−1.

For example, referring to FIGS. 1, 2 and 4, segment K becomes dirty (i.e. a change is written) at 410. Segment K is inserted in the queue 142 at the tail as 144-4. The firmware pages out segments K1, K2 and K3 as 144-1 . . . 144-3 at 412. Other segments 144 may follow depending on the size of the queue 142. Subsequently segment K is paged out 414, and is the last segment paged (i.e. written to storage memory as stored/flushed segment 130') prior to power failure. A maximum B−1 page-outs (segments 130 written to memory 130')

is limited by the size of the paging table 124, determined by the onboard volatile memory, as shown at 416. Subsequent to the segment 130' writes 418, the power failure occurs 420. The firmware 140 commences the replay process to replay the writes 422 occurring between the power failure 424 and the segment K becoming dirty 410, as shown at 426.

A particular feature provided by the disclosed approach over conventional implementations is that this approach presents an upper bound on the number of page outs during the replay process. This is important because writes to non-volatile memory are expensive time-wise and page-outs adversely affect unplanned power loss recovery time. This approach allows bounded recovery time from unplanned power-loss on SSDs with constrained volatile memory availability. It should also be noted that, with this approach, the context drop does not have to be monolithic. At the time of context drop, all the dirty segments are flushed to non-volatile memory. This makes the context drop more efficient and simpler.

Figure 5:
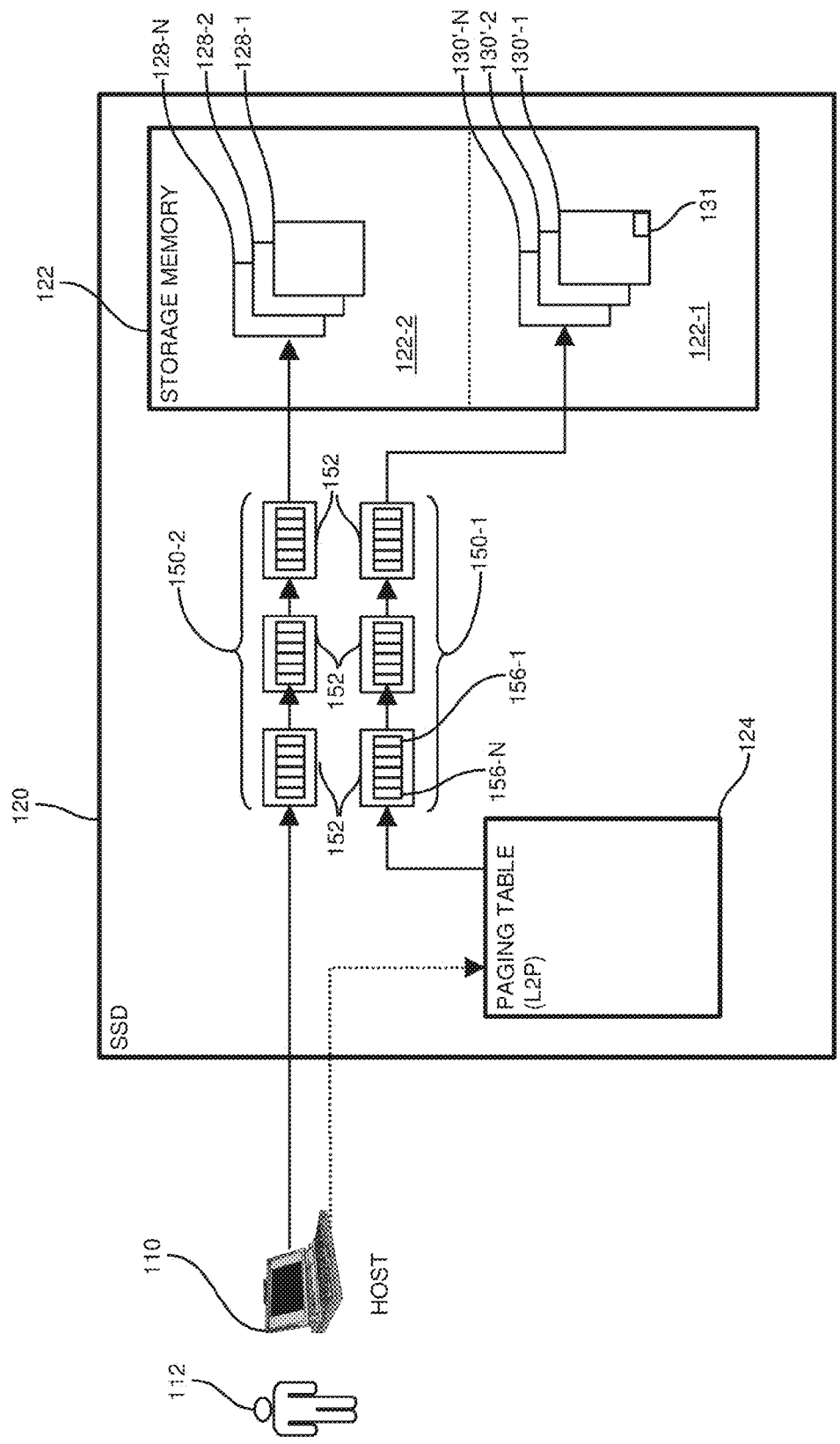
FIG. 5 shows system and user bands used in the memory components of FIG. 4.
Figure 6:
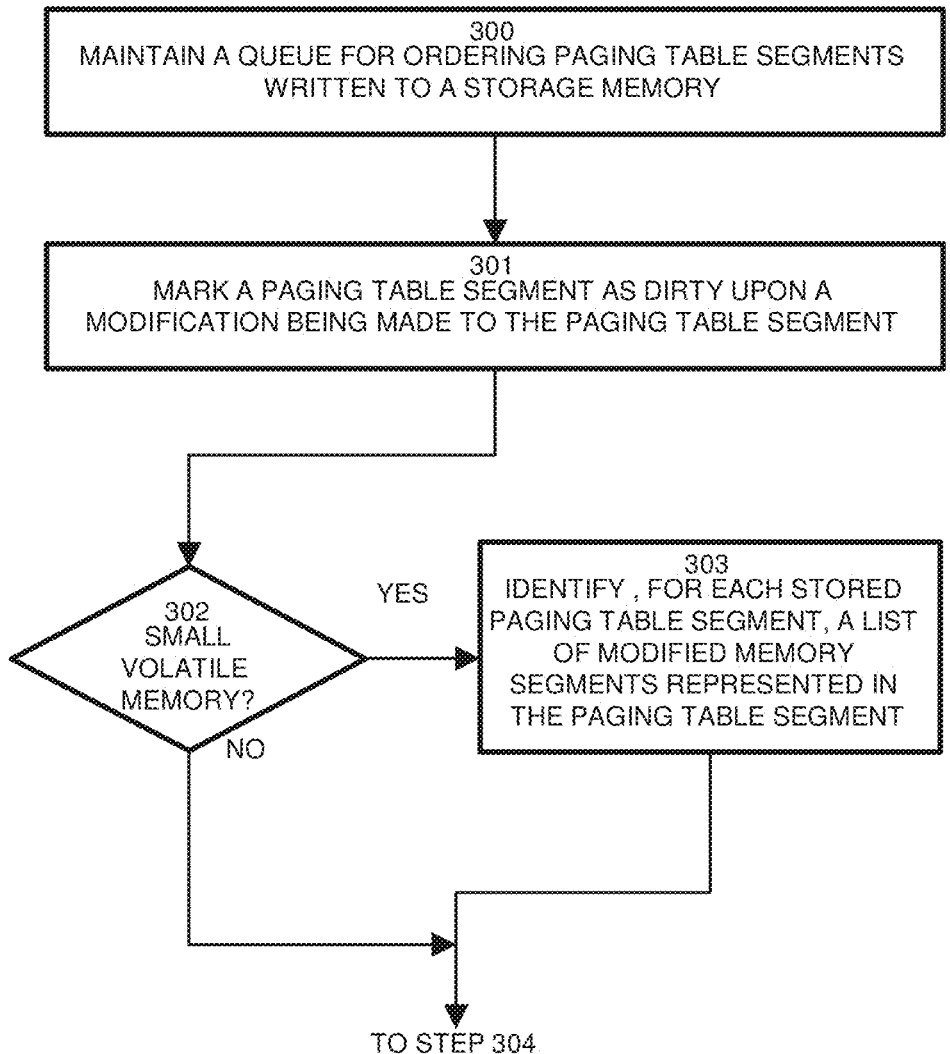
FIGS. 6-9 are a flowchart of the power loss and recovery mechanism as defined herein.
Figure 7:
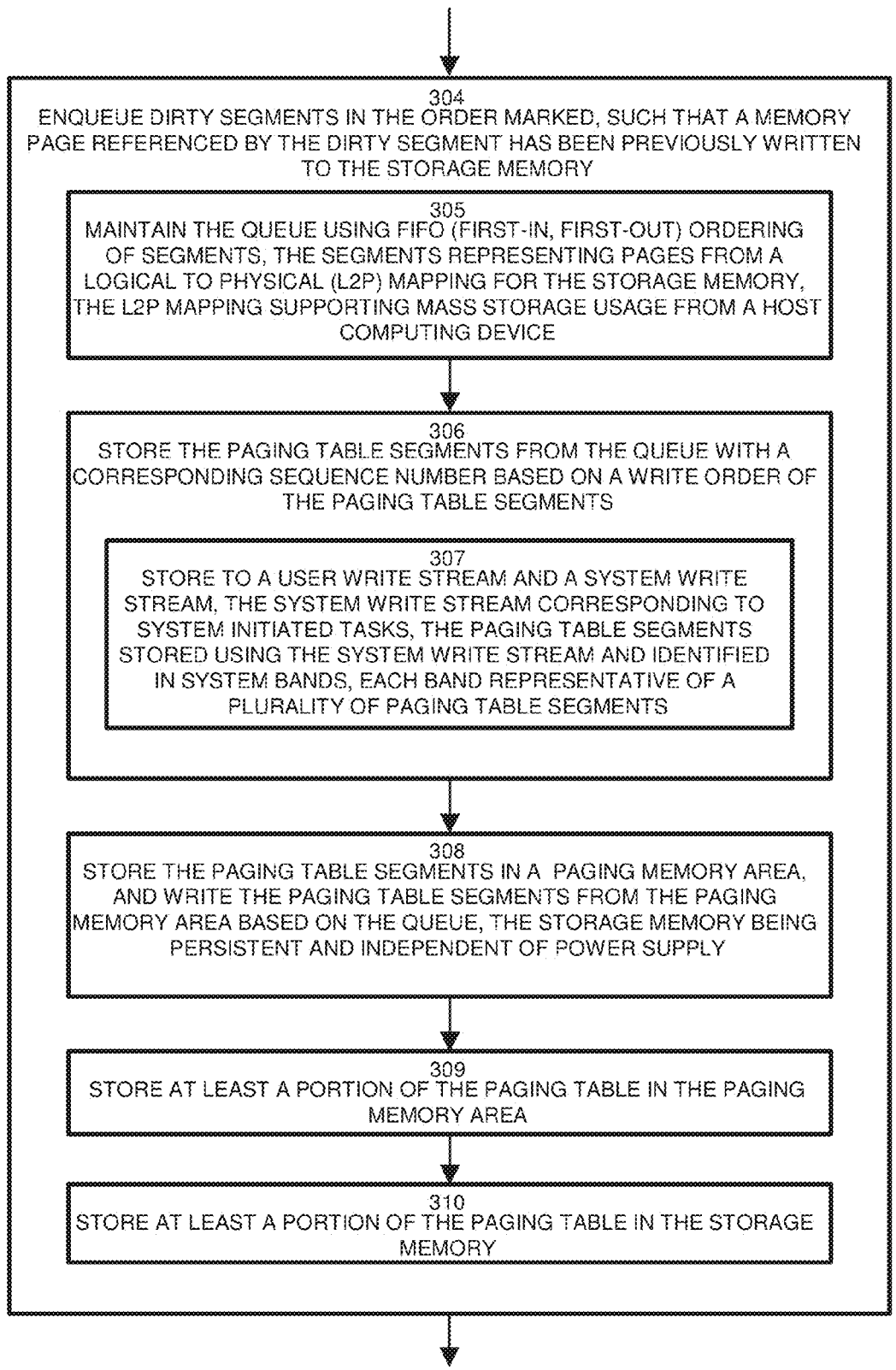
Figure 8:
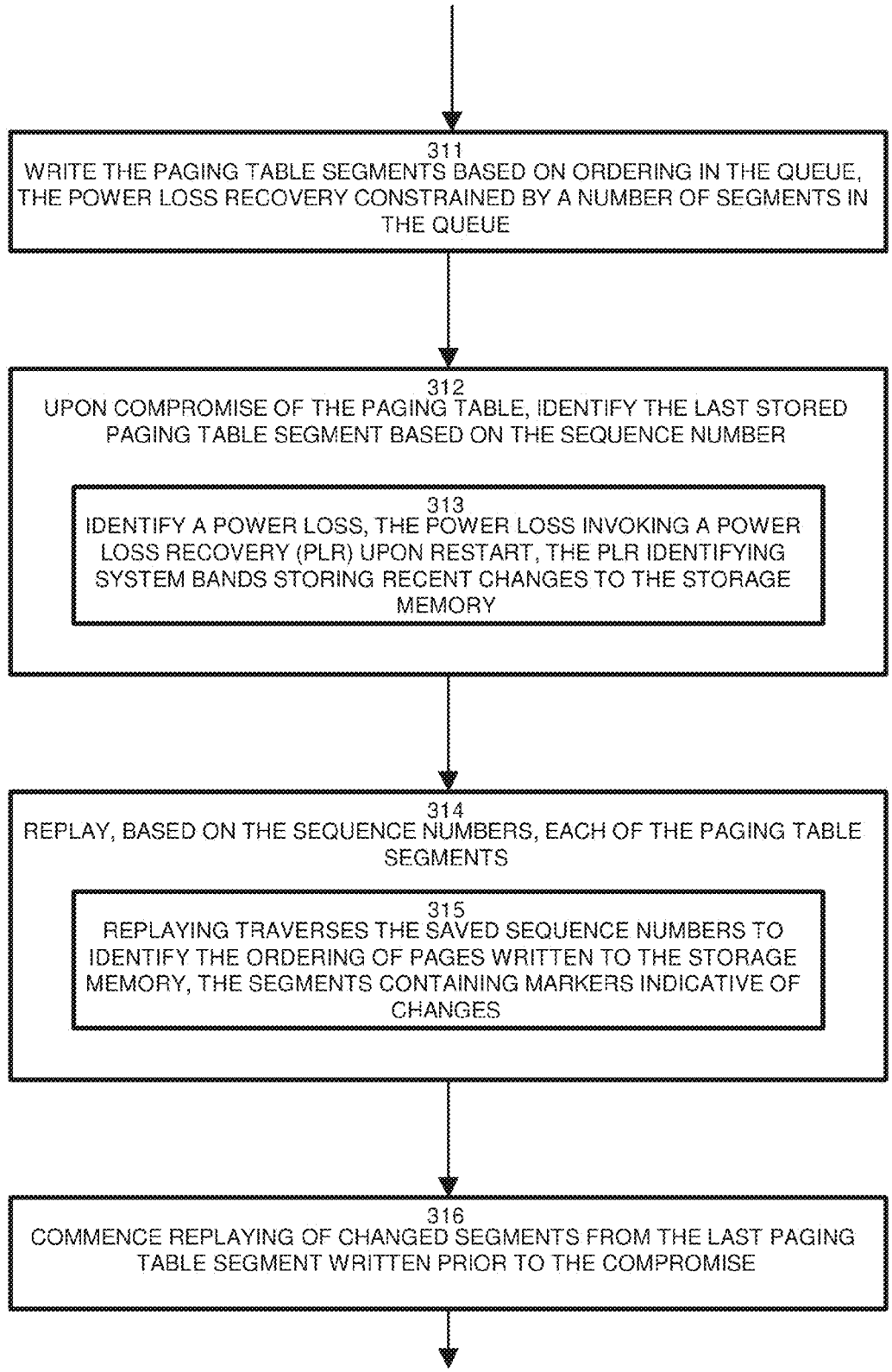
Figure 9:
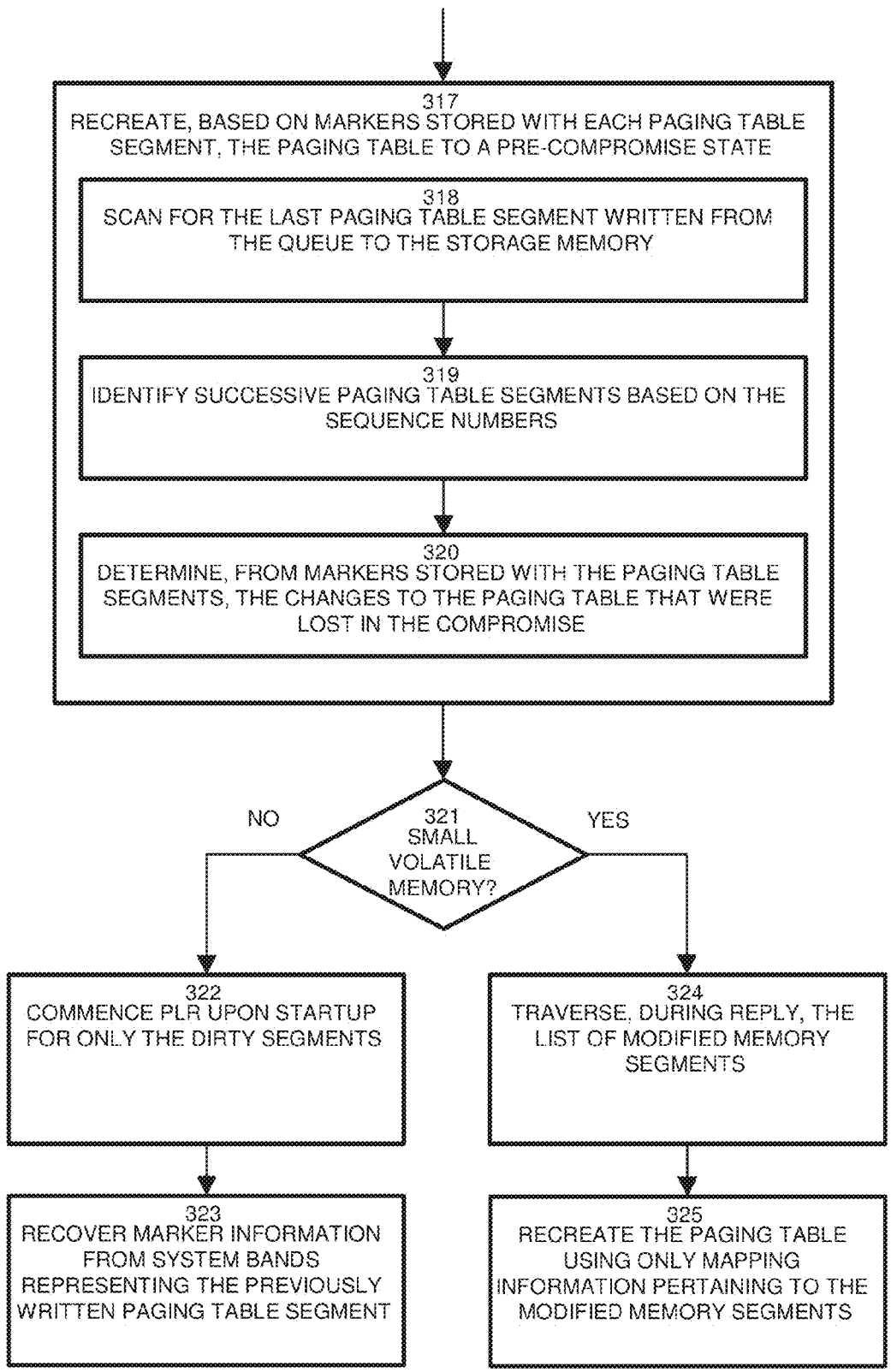

FIG. 5 shows system and user bands used in the memory components of FIG. 4. Referring to FIGS. 4 and 5, in the disclosed approach, the write stream to the storage memory 122 occur in system bands 150-1 and user bands 150-2, for system and user writes, respectively. System bands 150-1 store changes written to the storage memory 122 during a current context. At the end of a context, the bands are refreshed (flushed) and a new context commenced. A separate set of bands 150-2 exists for user data. Each band 152 includes a number of segments 156-1 ... 156-N, corresponding to the paging table segments 130' or the user segments 128, as disclosed herein. The replay procedure uses the sequence numbers 131 from the system bands 150-1 to recreate the paging table 124 by identifying the write stream that occurred between the last segment paged 414 to storage memory 122 and the last dirty segment 410. The system bands 150-1 and user bands 150-2 may write to respective system 122-1 and user 122-1 areas of the storage memory 122, or may be commingled.

FIGS. 6-9 are a flowchart of the power loss and recovery mechanism as defined herein. Referring to FIGS. 1-9, in an example arrangement, in a mass storage system having a paging table 124 for memory page redirection (L2P), the method of maintaining the paging table for power loss recovery (PLR) as disclosed herein includes, at step 300 establishing a FIFO queue for ordering paging table segments 130 written to a storage memory 122. The firmware 140 in the SSD 120 marks a paging table segment 126 as dirty upon a modification being made to the paging table segment 126, meaning that a change has been made to the segment 130, typically resulting from a change in a redirection pointer entry 126 for a memory page 128 referenced by the paging table segment 130, as depicted at step 301. A check is performed, at step 302, for determining if queue 142 space is limited, usually from an SSD with limited onboard volatile memory. In the case of a small volatile memory, a further optimization is performed to further reduce paging during replay, by identifying, for each stored paging table segment 130, a list of modified memory segments 128 represented in the paging table segment 130, as disclosed at step 303. This list is employed during replay, discussed further below.

The firmware 140 enqueues the dirty segments 144-1 ... 144-4 in the order marked, such that a memory page 128 referenced by the dirty segment has been previously written to the storage memory 122, as depicted at step 304. In the example arrangement, the firmware 140 maintains the queue 142 using FIFO (first-in, first-out) ordering of segments, such that the segments 144 represent pages from a logical to physical (L2P) mapping (in paging table 124) for the storage memory, in which the L2P mapping supports mass storage usage from a host computing device 110, as shown at step 305. The firmware 140 further stores the paging table segments 130' from the queue 142 with a corresponding sequence number 131 based on a write order of the paging table segments 130, as depicted at step 306. In contrast to conventional L2P queueing/caching approaches that employ an LRU queuing approach, the FIFO ordering and sequence number 131 allows replaying to be performed using the order the segments 130' were written to the storage memory 122.

In the example configuration, the implementation includes a user write stream 150-2 and a system write stream 150-1, in which the system write stream corresponds to system initiated tasks such as the paging table 124 management, in which the paging table segments 130 are stored using the system write stream 150-1 and identified in system bands, each band representative of a plurality of paging table segments 144'-1 ... 144'-N, as disclosed at step 307.

In the disclosed configuration, maintaining the queue 142 further includes storing the paging table segments 130 in a paging memory area 124 (volatile memory), and writing the queued paging table segments 144 from the paging memory area based on the queue 142, the storage memory 122 being persistent non-volatile memory and independent of power supply, as depicted at step 308. The queue 142 therefore provides paging/swapping for the paging table 124 that provides storing at least a portion of the paging table 124 in the paging memory area in volatile memory, as depicted at step 309, and storing at least a portion of the paging table in the storage memory 122, as shown at step 310.

The firmware 140 writes the paging table segments 144 based on ordering in the queue 142 during normal operation, such that the power loss recovery is constrained by a number of segments 144 represented in the queue 142. Therefore, the worst-case analysis of PLR performance may be assessed by the limits of the volatile memory and/or corresponding queue 142, as depicted at step 311.

At some later time, a power loss or other event causes loss of the volatile memory. Accordingly, upon compromise of the paging table 124, the firmware 140 identifies the last stored paging table segment 130' based on the sequence number 131, as shown at step 312. Detecting the compromise may further include identifying a power loss, such that the power loss invokes a power loss recovery (PLR) upon restart, in which the PLR mechanism identifies system bands 150-1 storing recent changes to the storage memory 122, as disclosed at step 313. Based on PLR 141 instruction in the firmware 140, the PLR replays, based on the sequence numbers 131, each of the paging table segments to recreate the paging table 124, as depicted at step 314. The PLR 141 replaying traverses the saved sequence numbers 131 to identify the ordering of pages written to the storage memory, such that the segments contain markers 129 indicative of the changes, as disclosed at step 315.

The PLR 141 commences replaying of changed segments from the last paging table segment 144 written prior to the compromise, as depicted at step 316, and recreates, based on the markers 129 stored with each paging table segment, the paging table to a pre-compromise state, as depicted at step 317. This includes scanning for the last paging table segment 130' written from the queue 142 to the storage memory 122, as shown at step 318, and identifying successive paging table segments 130 based on the sequence numbers 131, as depicted at step 319. The PLR 141 determines, from the markers 129 stored with the paging table segments, the changes to the paging table 124 that were lost in the compromise, as shown at step 320.

An addition to this scheme, especially for devices with smaller volatile memory capacity, strives to eliminate page-outs during replay. During runtime, each page-out is accompanied by dropping a list of dirty segments into the context band. During replay, only the L2P updates that correspond to a segment from this list are allowed. The other updates must correspond to a segment that was paged out in the period between segment k becoming dirty and segment k being paged-out—making these updates unnecessary. The downside of this approach is that the size of the list of dirty segments grows with the number of segments available and the overhead may be too large for larger volatile memory capacities.

Accordingly, a check is performed, at step 321, complementing the check at step 302. If a small volatile memory implementation is encountered, the PLR 141 traverses, during reply, the list of modified memory segments, as depicted at step 324, and recreates the paging table 124 using only mapping information pertaining to the modified memory segments, as shown at step 325.

Otherwise, the PLR 141 commences upon startup for only the dirty segments 144, as shown at step 322, and recovers marker information 129 from system bands representing the previously written paging table segment 130', as depicted at step 323.

Those skilled in the art should readily appreciate that the programs and methods defined herein are deliverable to a computer processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method for storing data comprising:
   identifying a sequence of paging table segments written to non-volatile memory from a paging table, the paging table translating a virtual reference to a physical location in the non-volatile memory;
   maintaining the identified sequence in a queue using FIFO (first-in, first-out) ordering of pointers to segments, the segments representing pages from a logical to physical (L2P) mapping for the non-volatile memory, the L2P mapping supporting mass storage usage from a host computing device;
   storing, for each paging table segment, a sequence number corresponding to the order written and at least one marker corresponding to changes in the segment; and
   upon detection of a compromise of at least a portion of the paging table, recreating the paging table segments corresponding to the identified sequence by replaying the changes from the stored markers and regenerating the compromised paging table segments, wherein replaying further comprises:
   traversing the saved sequence numbers to identify the ordering of pages written to the non-volatile memory, the segments containing markers indicative of changes, and
   commencing replaying of changed segments from the last paging table segment written prior to the compromise by scanning for the last paged-out segment as identified by its sequence number, the last paged-out segment specifying locations of write-stream pointers at the time when the segment first became modified, and commencing replay from this segment.

2. The method of claim 1 wherein recreating further comprises:
   scanning for the last paging table segment written from the queue to the non-volatile memory;
   identifying successive paging table segments based on the sequence numbers; and
   determining, from markers stored with the paging table segments, the changes to the paging table that were lost in the compromise.

3. The method of claim 1 wherein maintaining the queue further comprises: storing the paging table segments in a paging memory area, and writing the paging table segments from the paging memory area based on the queue, the non-volatile memory being persistent and independent of power supply.

4. The method of claim 3 wherein maintaining the queue further comprises:
   storing at least a portion of the paging table in the paging memory area;
   storing at least a portion of the paging table in the non-volatile memory; and
   writing the paging table segments based on ordering in the queue, the power loss recovery constrained by a number of segments in the queue.

5. The method of claim 1 wherein the maintaining the identified sequence includes a FIFO queue to keep track of the order in which segments become modified, for eviction using FIFO policy.

6. At least one non-transitory computer readable medium having instructions encoded thereon for performing a method of storing a logical to physical (L2P) mapping table, the instructions when executed on a host computing device cause the computing device to perform a method comprising:
   maintaining a queue for ordering segments of a paging table written to a non-volatile memory, the paging table for memory page redirection in anticipation of power loss recovery (PLR), maintaining the identified sequence including a queue using FIFO (first-in, first-out) ordering of pointers to segments, the segments representing pages from a logical to physical (L2P) mapping for the non-volatile memory, the L2P mapping supporting mass storage usage from a host computing device;
   storing the paging table segments from the queue with a corresponding sequence number based on a write order of the paging table segments;
   upon compromise of the paging table, identifying the last stored paging table segment based on the sequence number;

replaying, based on the sequence numbers, each of the paging table segments; and recreating, based on markers stored with each paging table segment, the paging table to a pre-compromise state, wherein replaying further comprises:

traversing the saved sequence numbers to identify the ordering of pages written to the non-volatile memory, the segments containing markers indicative of changes, and commencing replaying of changed segments from the last paging table segment written prior to the compromise by scanning for the last paged-out segment as identified by its sequence number, the last paged-out segment specifying locations of write-stream pointers at the time when the segment first became modified, and commencing replay from this segment.

7. The method of claim 6 further comprising maintaining the identified sequence in a queue using FIFO (first-in, first-out) ordering of segments, the segments representing pages from a logical to physical (L2P) mapping for the non-volatile memory, the L2P mapping supporting mass storage usage from a host computing device.

8. The method of claim 6 wherein recreating further comprises:

scanning for the last paging table segment written to the non-volatile memory;

identifying successive paging table segments based on the sequence numbers; and determining, from markers stored with the paging table segments, the changes to the paging table that were lost in the compromise.

9. The method of claim 8 wherein replaying traverses the saved sequence numbers to identify the ordering of pages written to the non-volatile memory, the segments containing markers indicative of changes, and commencing replaying of changed segments from the last paging table segment written prior to the compromise.

10. The method of claim 6 wherein detecting the compromise further comprises identifying a power loss, the power loss invoking a power loss recovery (PLR) upon restart, the PLR identifying system bands storing recent changes to the non-volatile memory.

11. The method of claim 6 further comprising writing a user write stream and a system write stream, the system write stream corresponding to system initiated tasks, the paging table segments stored using the system write stream and identified in system bands, each band representative of a plurality of paging table segments.

12. The method of claim 6 wherein maintaining the queue further comprises:

marking a paging table segment as dirty upon a modification being made to the paging table segment;

enqueuing dirty segments in the order marked, such that a memory page referenced by the dirty segment has been previously written to the non-volatile memory;

commencing PLR upon startup for only the dirty segments; and recovering marker information from system bands representing the previously written paging table segment.

13. The method of claim 6 further comprising reducing paging during replay, further comprising:

identifying, for each stored paging table segment, a list of modified memory segments represented in the paging table segment;

traversing, during reply, the list of modified memory segments; and recreating the paging table using only mapping information pertaining to the modified memory segments.

14. A computing apparatus for storing data comprising:

a paging memory to store a paging table for memory page redirection in anticipation of power loss recovery (PLR);

a queue for ordering segments of the paging table written to a non-volatile memory, the queue using FIFO (first-in, first-out) ordering of pointers to segments, the queue maintaining the identified sequence, the segments representing pages from a logical to physical (L2P) mapping for the non-volatile memory, the L2P mapping supporting mass storage usage from a host computing device;

storage logic to store the paging table segments from the queue with a corresponding sequence number based on a write order of the paging table segments;

power loss recovery logic to, upon compromise of the paging table, identify the last stored paging table segment based on the sequence number;

an interface to the non-volatile memory to replay, based on the sequence numbers, each of the paging table segments; and an interface to the paging memory to recreate, based on markers stored with each paging table segment, the paging table to a pre-compromise state, the interfaces adapted to:

traverse the saved sequence numbers to identify the ordering of pages written to the non-volatile memory, the segments containing markers indicative of changes, and commence replaying of changed segments from the last paging table segment written prior to the compromise by scanning for the last paged-out segment as identified by its sequence number, the last paged-out segment specifying locations of write-stream pointers at the time when the segment first became modified, and commencing replay from this segment.

15. The computing apparatus of claim 14 further comprising a user write stream and a system write stream, the system write stream corresponding to system initiated tasks, the paging table segments stored using the system write stream and identified in system bands, each band representative of a plurality of paging table segments.

16. The computing apparatus of claim 14 wherein the storage logic is to maintain the queue by storing the paging table segments in a paging memory area, and writing the paging table segments from the paging memory area based on the queue, the non-volatile memory being persistent and independent of power supply.

17. The computing apparatus of claim 16 wherein the storage logic is further configured to:

store at least a portion of the paging table in the paging memory area;

store at least a portion of the paging table in the non-volatile memory; and write the paging table segments based on ordering in the queue, the power loss recovery constrained by a number of segments in the queue.

18. The computing apparatus of claim 14 wherein the paging table segments further comprise markers, the PLR logic to traverse the saved sequence numbers to identify the ordering of pages written to the non-volatile memory, the segments containing markers indicative of changes, the PLR logic to commence the replay of changed segments from the last paging table segment written prior to the compromise.

* * * * *